UNITED STATES PATENT OFFICE

2,297,453

OPTICAL GLASS

Edwin Berger and Karl Rehm, Jena, Germany; vested in the Alien Property Custodian No Drawing. Application November 25, 1940, Serial No. 367,010. In Germany December 11, 1939

3 Claims. (Cl. 106—54)

The present invention refers to optical glasses whose refractive index $n_d$ and Abbe constant $\nu$ are interrelated by the relation $$n_d > 1.86 - 0.004\nu$$

i. e., where the refractive index is relatively high compared with the usual class of optical glasses having the same chromatic dispersion. Glasses have become known which embody this property and which, for the purpose of achieving said property contain bivalent oxides with a high content of lanthanum oxide in addition to other glass-forming materials. However, owing to the tendency of a high content of lanthanum oxide leading easily to crystallization, especially if large quantities of silicic oxide are used, the introduction of silicic acid was dispensed with and the tendency to crystallization counteracted by embodying a high content of boron oxide. This however led to glasses having a low resistance to acids.

According to the invention glasses are obtained having the abovesaid optical position and satisfactory resistivity to acids, without showing any tendency to crystallization in melting provided the content of lanthanum oxide does not exceed 20% and that of boron oxide 25%, whereas the content of barium oxide is apportioned to amount to at least 45%. Barium oxide may be substituted in part by other oxides of earth alkalis as well as by zinc oxide or lead oxide, but must not amount to less than 25%.

To raise their acid resistivity substantial quantities of silicic oxide can be incorporated in the new glasses without any crystallization taking place. To achieve a high acid resistivity in doing so the content of silicic oxide is recommended to amount to at least 10%.

In the annexed table five examples of the new glasses are listed according to their composition and their optical position.

|  | I | II | III | IV | V |
|---|---|---|---|---|---|
| $SiO_2$ | 15.0 | 10.0 | 0.5 | 10.0 | 25.00 |
| $TiO_2$ |  |  |  |  | 6.0 |
| $ZrO_2$ |  | 5.0 |  |  |  |
| $B_2O_3$ | 15.0 | 15.0 | 19.5 | 15.0 | 11.0 |
| $Al_2O_3$ |  |  |  |  | 2.0 |
| $As_2O_3$ |  |  |  |  | 0.3 |
| $CaO$ |  |  |  |  | 7.0 |
| $ZnO$ |  |  |  |  | 3.4 |
| $PbO$ |  |  |  |  | 10.0 |
| $Na_2O$ |  |  |  |  | 0.3 |
| $BaO$ | 50.0 | 50.0 | 70.0 | 60.0 | 25.0 |
| $La_2O_3$ | 20.0 | 20.0 | 10.0 | 15.0 | 10.0 |
| $n_d$ | 1.695 | 1.718 | 1.673 | 1.660 | 1.714 |
| $\nu$ | 52.3 | 49.0 | 55.2 | 55.7 | 40.8 |

We claim:

1. An optical glass having an index of refraction $n_d$ and an Abbe constant $\nu$ whereby $$n_d > 1.86 - 0.004\nu$$

and containing substantial quantities of boron oxide, bivalent ovides and lanthanum oxide, the content of boron oxide amounting at the most to 25%, the content of barium oxide amounting to at least 25%, the content of barium oxide and of other oxides of earth alkalis as well as of zinc oxide and lead oxide amounting in total to at least 45%, and the content of lanthanum oxide amounting to 20% at the most.

2. An optical glass having an index of refraction $n_d$ and an Abbe constant $\nu$ whereby $$n_d > 1.86 - 0.004\nu$$

and containing substantial quantities of boron oxide, bivalent oxides, lanthanum oxide and silicic oxide, the content of boron oxide amounting at the most to 25%, the content of barium oxide amounting to at least 25%, the content of barium oxide and of other oxides of earth alkalis as well as of zinc oxide and lead oxide amounting in total to at least 45%, and the content of lanthanum oxide amounting to 20% at the most.

3. An optical glass having an index of refraction $n_d$ and an Abbe constant $\nu$ whereby $$n_d > 1.86 - 0.004\nu$$

and containing substantial quantities of boron oxide, bivalent oxides, lanthanum oxide and silicic oxide, the content of boron oxide amounting at the most to 25%, the content of barium oxide amounting to at least 25%, the content of barium oxide and of other oxides of earth alkalis as well as of zinc oxide and lead oxide amounting in total to at least 45%, the content of lanthanum oxide amounting to 20% at the most and the content of silicic oxide amounting to at least 10%.

EDWIN BERGER.
KARL REHM.